US007437663B2

(12) United States Patent
Lakhdhir et al.

(10) Patent No.: US 7,437,663 B2
(45) Date of Patent: Oct. 14, 2008

(54) OFFLINE DYNAMIC WEB PAGE GENERATION

(75) Inventors: Mansoor Lakhdhir, Austin, TX (US);
Mike V. Macias, Round Rock, TX (US);
Jagdish D. Massand, Austin, TX (US);
Melinda Yuki McMillan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1517 days.

(21) Appl. No.: 10/046,999

(22) Filed: Jan. 16, 2002

(65) Prior Publication Data

US 2003/0135819 A1 Jul. 17, 2003

(51) Int. Cl.
*G06F 15/00* (2006.01)

(52) U.S. Cl. .................................................. 715/234

(58) Field of Classification Search ................ 715/513, 715/501, 205, 234; 709/246
See application file for complete search history.

(56) References Cited

U.S. PATENT DOCUMENTS

| 5,715,453 | A |   | 2/1998  | Stewart ....................... 395/615 |
| 5,790,793 | A |   | 8/1998  | Higley ................... 395/200.48 |
| 5,835,712 | A |   | 11/1998 | DuFresne .............. 395/200.33 |
| 5,884,266 | A |   | 3/1999  | Dvorak ....................... 704/275 |
| 5,987,480 | A | * | 11/1999 | Donohue et al. ......... 715/501.1 |
| 6,021,416 | A |   | 2/2000  | Dauerer et al. ............... 707/501 |
| 6,035,119 | A |   | 3/2000  | Massena et al. ............. 395/701 |
| 6,061,698 | A |   | 5/2000  | Chadha et al. .............. 707/513 |
| 6,112,242 | A |   | 8/2000  | Jois et al. ..................... 709/225 |
| 6,178,426 | B1 |  | 1/2001  | Klein et al. .................. 707/102 |
| 6,195,666 | B1 |  | 2/2001  | Schneck et al. ............. 707/513 |
| 6,205,432 | B1 |  | 3/2001  | Gabbard et al. ............... 705/14 |
| 6,205,485 | B1 |  | 3/2001  | Kikinis ........................ 709/231 |
| 6,226,285 | B1 |  | 5/2001  | Kozdon et al. .............. 370/352 |
| 6,301,579 | B1 | * | 10/2001 | Becker ........................ 707/102 |
| 6,623,529 | B1 | * | 9/2003  | Lakritz ........................ 715/536 |
| 6,760,746 | B1 | * | 7/2004  | Schneider ................... 709/203 |
| 2001/0044813 | A1 | * | 11/2001 | Frank .......................... 707/530 |
| 2002/0004813 | A1 | * | 1/2002  | Agrawal et al. ............. 709/201 |

(Continued)

FOREIGN PATENT DOCUMENTS

JP          1196234        4/1999

(Continued)

OTHER PUBLICATIONS

IBM Research Disclosure 442144, "c++doc—program which extracts documentation from source code", Feb. 2001, pp. 310-312.

*Primary Examiner*—C B Paula
(74) *Attorney, Agent, or Firm*—Duke W. Yee; Justin M. Dillon; Theodore D. Fay, III

(57) ABSTRACT

A method, computer program product, electronic document product, and data processing system for rendering web pages containing dynamic data is disclosed. A rendering program executes periodically to render web documents from source documents, base strings for various visual features, database information, and descriptive text. Special command strings located within a source document direct the rendering program to insert information for a database or to insert descriptive text. The format for the inserted data is determined according to a base string for the particular feature(s) of the document being inserted. The resulting rendered document is stored on the web server for quick retrieval with little or no additional document processing.

35 Claims, 6 Drawing Sheets

U.S. PATENT DOCUMENTS

| | | | |
|---|---|---|---|
| 2002/0059327 A1* | 5/2002 | Starkey .................. | 707/203 |
| 2002/0080938 A1* | 6/2002 | Alexander et al. ..... | 379/106.01 |
| 2003/0005159 A1* | 1/2003 | Kumhyr .................. | 709/246 |
| 2004/0128346 A1* | 7/2004 | Melamed et al. ........ | 709/203 |

FOREIGN PATENT DOCUMENTS

| | | |
|---|---|---|
| JP | 11237976 | 8/1999 |
| JP | 11305904 | 11/1999 |
| WO | WO 98/53031 | 11/1998 |

* cited by examiner

FIG. 5

```
<form>
<table width=700>
<tr><td>

<h2>Title</h2>                          ← 500

<br>
<table>
<tr><td valign=top>
            ─────502─────
exec_pp:type_directions:0:TABLE <br><br>
<b>Classification</b><br>
            ─────504─────
exec_pp:CHECKBOX:d_class_domain:1:TABLE
     /        /         /         /    \
    506     508       510       512    514

<br>
</td></tr></table>
<br>
</td></tr></table>
</form>
```

CHECKBOX: <INPUT TYPE="CHECKBOX" NAME="$$$field_name=$$$ field_value" VALUE="$$$desc"$$$checked_flag>$$$desc<br>

RADIO: <INPUT TYPE="RADIO" NAME="$$$field_name" VALUE="$$$field_value">$$$ desc

LABEL: $$$desc

TEXT: <INPUT TYPE="TEXT" NAME="$$$field_name" VALUE="$$$field_value">

HIDDEN: <INPUT TYPE="HIDDEN" NAME="$$$field_name" VALUE="$$$field_value">

SUBMIT: <INPUT TYPE="SUBMIT" NAME="$$$field_name" VALUE="$$$field_value">

H2TITLE: <h2>$$$desc</h2>

FIG. 6 example : -
type_navigation_title : Type
type_directions : Select all the classifications that best describe your solution

FIG. 7

```
<form>
<table width=700>
<tr><td>

<h2>Type</h2>

<br>
<table>
<tr><td valign=top>

Select all the classifications that best describe your solution. —802

<br><br>
<br>>Classification</b><br>
<tr><td> —806
<input type="CHECKBOX" name="Classification-APPLET" value="applet" checked>Applet<br>
</td></tr>
<tr><td>   }806
<input type="CHECKBOX" name="Classification-TOOL" value="tool" checked>Tool<br>
</td></tr> —806
<br>
</td></tr></table>
<br>
</td></tr></table>
</form>
```

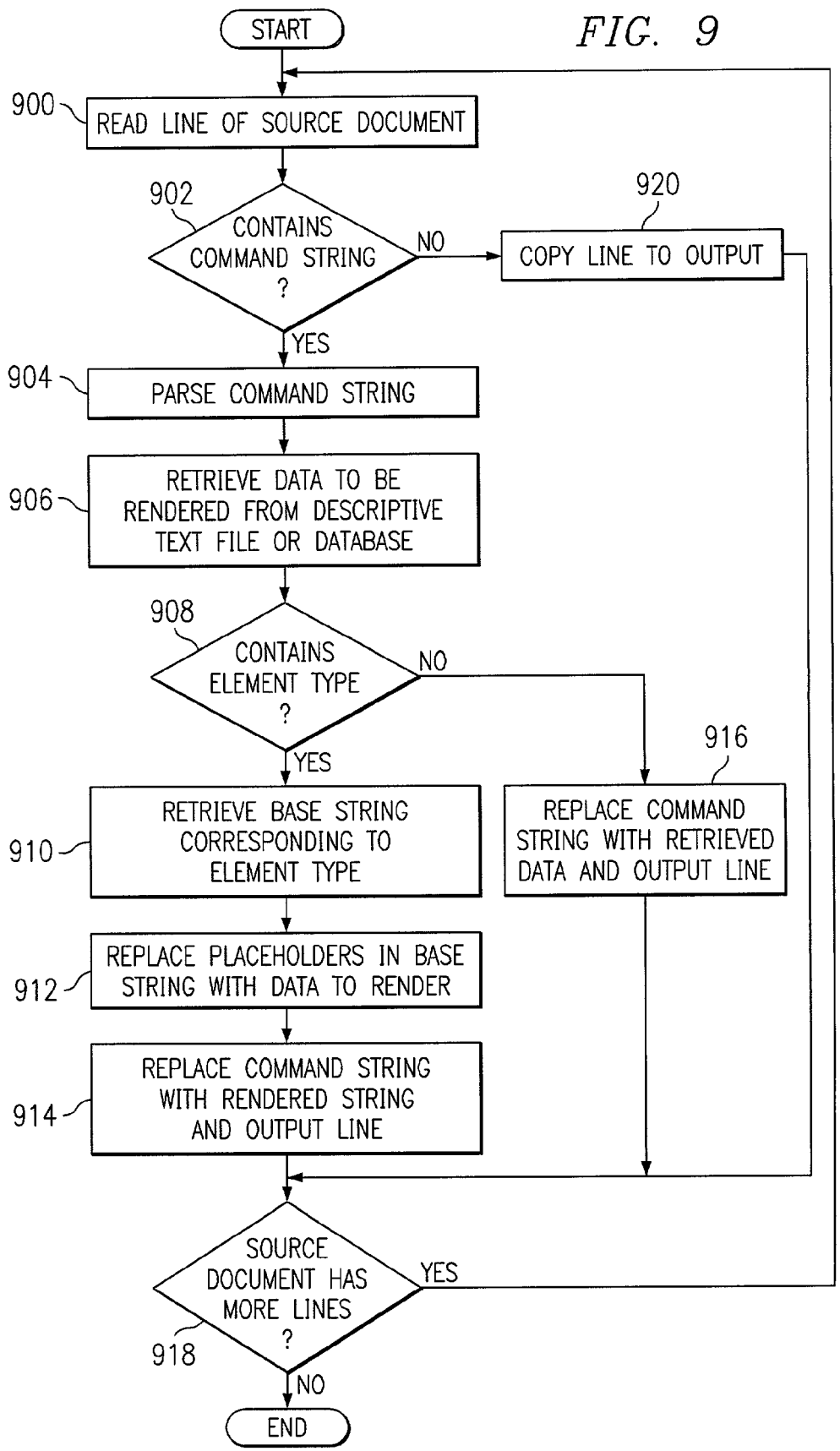

OFFLINE DYNAMIC WEB PAGE GENERATION

BACKGROUND OF THE INVENTION

1. Technical Field

The present invention is directed generally toward the creation of dynamic web pages. More specifically, the present invention is directed toward a system for rendering web pages from data stored in a databases or text files and storing the web pages for later retrieval by a web server.

2. Description of Related Art

Since the introduction of the World Wide Web and the subsequent commercialization of the Internet, the world has become a considerably more connected place. No longer bound to the primitive communications interfaces of the past, the Internet is now host to a variety of powerful communications media, including interactive hypertext browsing (the World Wide Web), instant messaging, streaming video and audio, and multimedia electronic mail.

Hypertext is a method of organizing textual and graphical information on a computer screen. Information is organized into "pages," which resemble printed pages in a book or (perhaps more accurately) printed scrolls (since a hypertext page can be of any length). The primary difference between hypertext and the printed word, however, lies in the fact that hypertext pages can contain links. That is, a portion of a hypertext document, such as a phrase or a graphic, may be made sensitive to clicking by the mouse such that when the user clicks on that portion, the user is directed to a new page or a different section of the current page. For instance, it is a common practice to make bibliographic citations into links. When a user clicks on one of these citations, the cited text appears on the screen. Hypertext documents are displayed using a program called a "browser."

The largest and best-known repository of hypertext documents is the World Wide Web, a loosely bound collection of publicly accessible hypertext documents stored on computers the world over. The World Wide Web has become the preferred Internet medium for publishable information as well as for providing such interactive features as online shopping—to the extent that the terms Internet and World Wide Web are virtually synonymous to some.

Browsers can download hypertext documents from a server with the HyperText Transfer Protocol (HTTP). HTTP allows a browser to request documents or files from a server and receive a response. In addition, when browser users enter information into a form embedded into a hypertext page, the browser transmits the information to a server using HTTP. Form information can then be passed along to applications residing on the server by way of the Common Gateway Interface (CGI). Those applications can then return a result, which may be written in HTML.

CGI is a very versatile and powerful tool for developing web applications. CGI programs take in information from "standard input" and through operating system environment variables. CGI programs return an output through "standard output." Almost all computer languages support some kind of "standard input" and "standard output." Many, if not most CGI programs, however, are written in Perl or some other similar scripting language, since these languages tend to have rather powerful string-processing capabilities, require no compiling, and come complete with an arsenal of weakly-typed abstract data structures (e.g., lists, hash tables, etc.).

With all its power and versatility, however, CGI does have some limitations. Because CGI programs generally create the web pages they output, it is often necessary to modify a CGI program simply to change a cosmetic detail in its output. This modification can be difficult to do, since one must comb through lines of code in order to find the portion that actually renders the display. To complicate matters, a CGI program containing conditional branches may, in fact, contain two or more portions of code to perform the same rendering. This is at best an inconvenience to CGI programmers and at worst a nightmare to non-programmer web designers.

A number of products exist to simplify the creation of web pages with dynamic data. Server-side scripting languages such as Microsoft Active Server Pages (ASP), from Microsoft, Inc., and PHP, which is freely-available, allow for the inclusion of server-side program code within HTML document files. These products work by having a web server or other pre-processor execute the code and render a result, which is incorporated into the HTML page and transmitted to the client. These server-side scripting tools may be used in conjunction with a database and can thus be used to render data from a database in an HTML page without a programmer's having to create a CGI program. ASP, PHP, and products like them keep the program code from obscuring the structure and flow of an HTML page, since ASP and PHP code are embedded into the HTML page, rather than the HTML being embedded into a CGI program. In this way, these server-side scripting tools allow web designers who have no programming knowledge to easily examine and edit the aesthetic features of an HTML page while leaving the programming details to the programmers.

These server-side scripting languages are not without some drawbacks, however. Firstly, most server-side scripting languages are procedural. That is, they contain flow control instructions for making loops and conditional branches. A server-side script may include, for example, a loop that renders a repeated HTML feature. In such cases, the separation between programming code and HTML data is blurred. Secondly, server-side scripting still requires program code to be developed for retrieving and rendering dynamic data. It would be better if the dynamic data could be rendered with a minimum of programming. Thirdly, server-side scripting can cause web server performance to degrade. Executing the embedded code each time a page is retrieved from the server means that the server must perform much more computation on each web transaction. This clearly affects the performance of the server.

What is needed, then, is a method of rendering dynamic data in a web environment that requires little or no programmer intervention and that does not impose the performance demands of on-the-fly rendering, as provided by server-side scripting languages.

SUMMARY OF THE INVENTION

The present invention provides a method, computer program product, electronic document product, and data processing system for rendering web pages containing dynamic data. A rendering program executes periodically to render web documents from source documents, base strings for various visual features, database information, and descriptive text. Special command strings located within a source document direct the rendering program to insert information for a database or to insert descriptive text. The format for the inserted data is determined according to a base string for the particular feature(s) of the document being inserted. The resulting rendered document is stored on the web server for quick retrieval with little or no additional document processing.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram of a source document in accordance with a preferred embodiment of the present invention;

FIG. 6 is a diagram of an element type database in accordance with a preferred embodiment of the present invention;

FIG. 7 is a diagram of a descriptive text file in accordance with a preferred embodiment of the present invention;

FIG. 8 is a diagram of a completed, rendered web document in accordance with a preferred embodiment of the present invention; and FIG. 9 is a flowchart representation of a process of rendering a web document in accordance with a preferred embodiment of the present invention.

DETAILED DESCRIPTION OF THE PREFERRED EMBODIMENT

Figure 1:
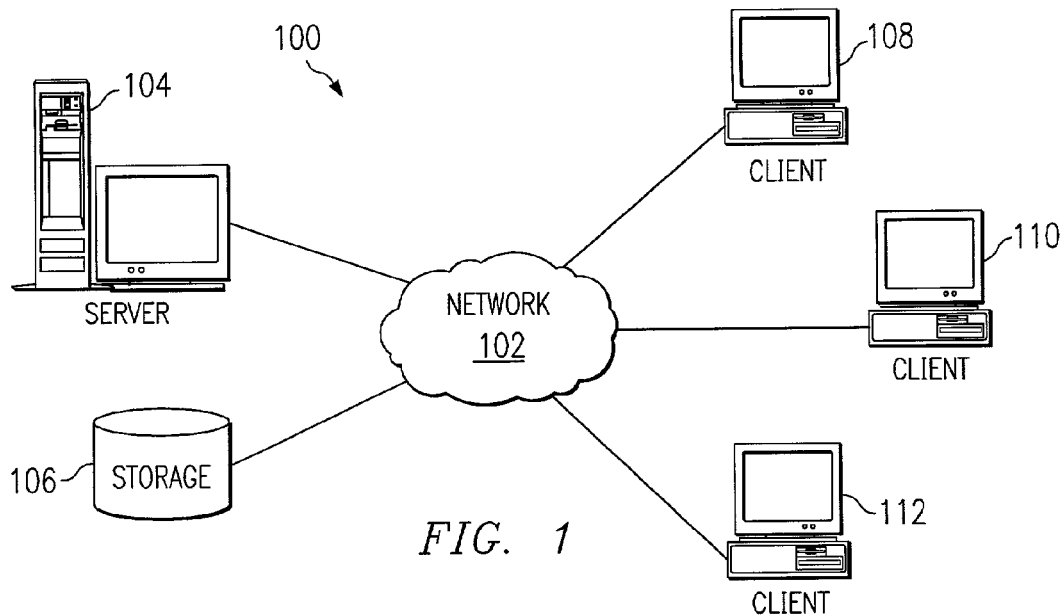
FIG. 1 is a diagram of a distributed data processing system in which the present invention can be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
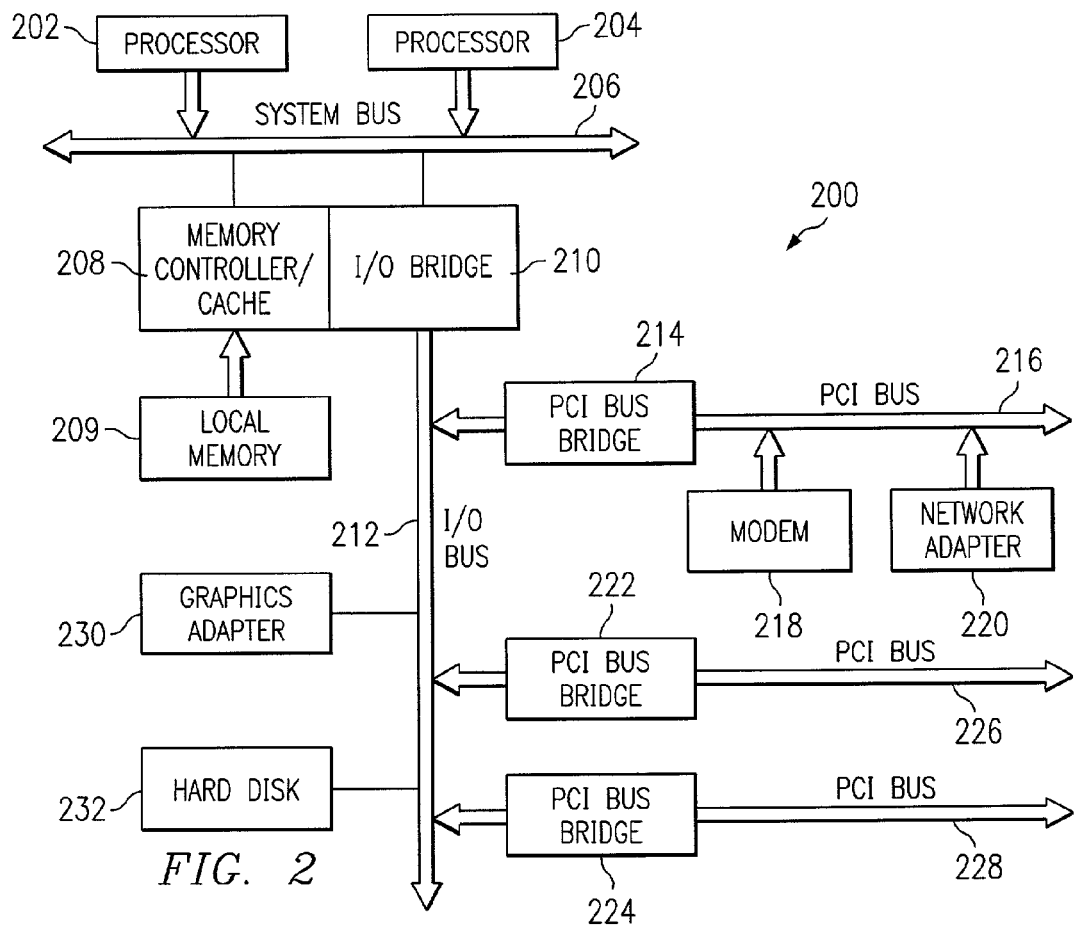
FIG. 2 is a block diagram of a server in the distributed data processing system of FIG. 1.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
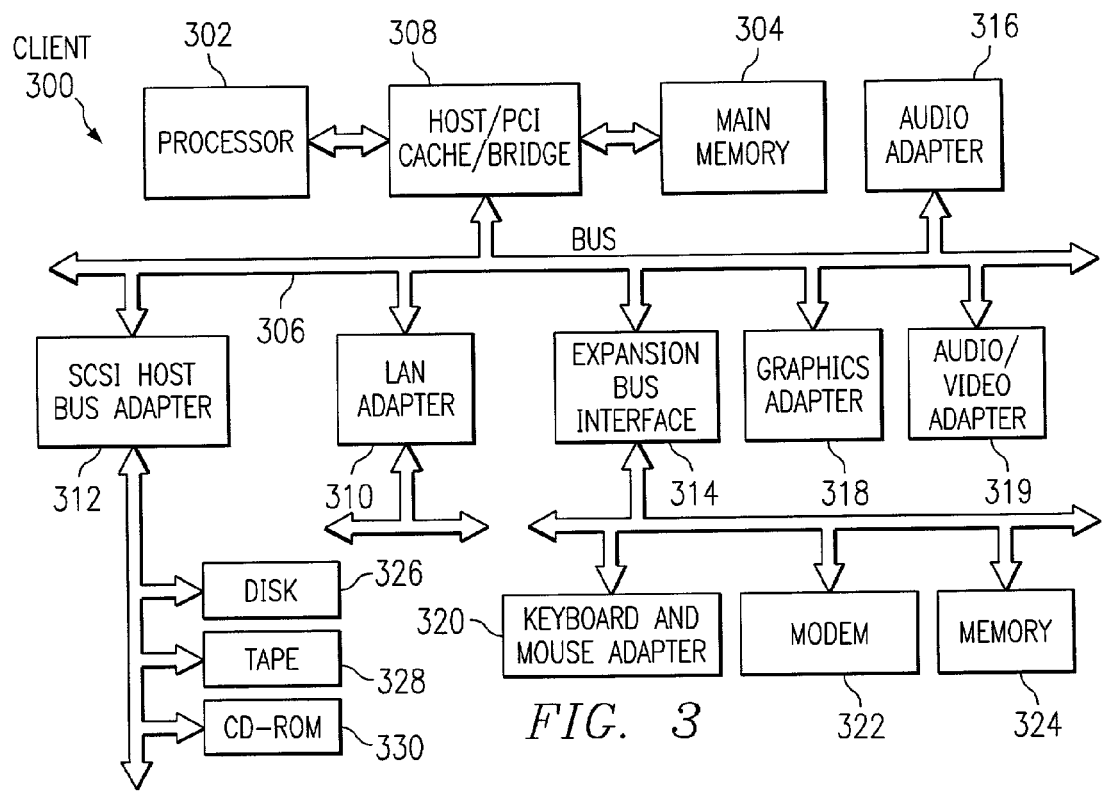
FIG. 3 is a block diagram of a client in the distributed data processing system of FIG. 3.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
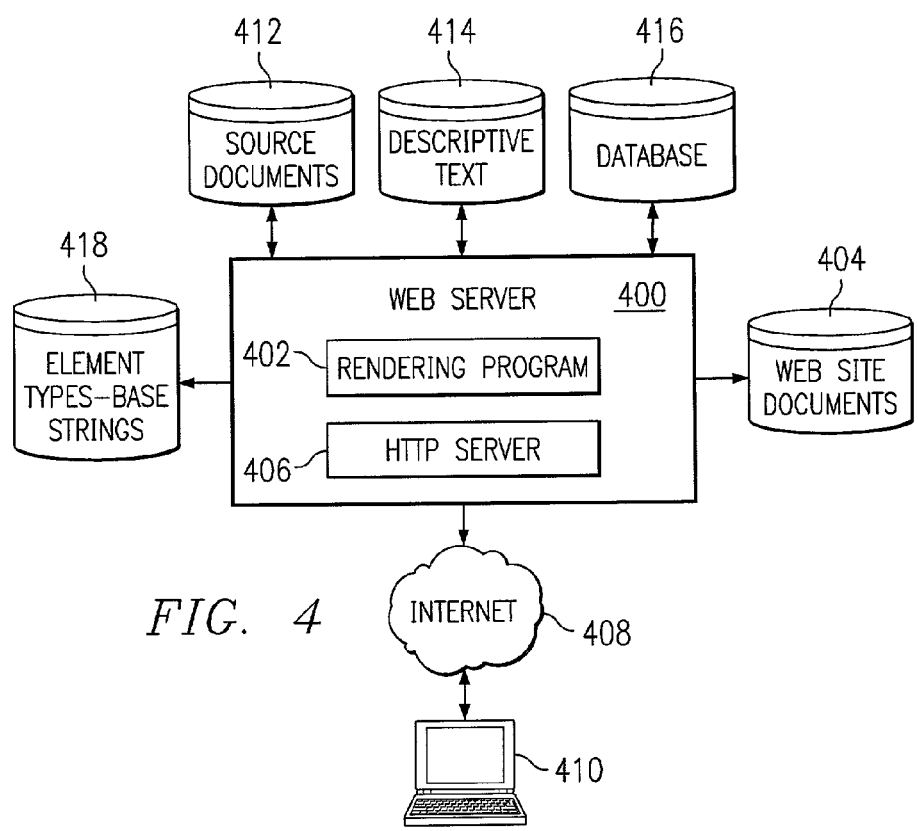
FIG. 4 is a diagram depicting an overall view of a preferred embodiment of the present invention.

The present invention is directed toward rendering HTML documents containing dynamic data. FIG. 4 is a diagram providing an overall view of the operation of a preferred embodiment of the present invention. Web server 400 contains two computer programs, rendering program 402 and HTTP server 406. Rendering program 402 generates a number of web site documents 404, which are transmitted by HTTP Server 406 through Internet 408 to a client machine, such as client 410.

The purpose of rendering program 402 is to generate web pages containing dynamic data. Dynamic data is data that is subject to change over time. An example of dynamic data is a schedule of airline flights containing flight times, availability, and pricing information. All of these items of data are subject to change. For instance, if a flight reservation is made on a particular flight, the availability of seats on that flight is reduced. A database storing flight information will be updated to reflect the new information.

What rendering program 402 does is to generate web documents (pages) that reflect the current state of the dynamic data at a particular time. Rendering program 402 starts with a source document from source documents 412. This source document will contain command strings that identify the particular data to be included in the final web document. Rendering program 402 parses a command string to identify the source of the data to be inserted into the final document.

The source of the inserted data may be a descriptive text file, such as descriptive text file 414. Descriptive text file 414 contains name-value pairs that map a set of names to a set of strings containing (descriptive) text to be inserted to the final web document. The command string in the source document will identify one of these names and the corresponding text will be inserted into the final web document in place of the command string.

Multiple descriptive text files may be employed with a single source document, with rendering program 402 being directed to use a particular one of the descriptive text files when rendering a final web document. In this way, different descriptive text files, each having the same set of names, can be produced for each of a set of languages. Thus, a single source document may be used to produce web documents in translation.

The source of the inserted data may also be a database, such as database 416. Database 416 may comprise any of a number of different types of programs or files for storing data. Database 416 may be, for example, a relational database, an object-oriented database, an object-relational database, a Unix DBM file, a flat text file, or the like. Database 416 may store name-value pairs of data or may store more complex structures such as data objects or tables.

The command string from the source document may, for example, direct that a list or table of data be inserted into the final web document. In this case, rendering program 402 will retrieve the table of data from database 416. A number of methods of retrieving data from a database will be familiar to those of ordinary skill in the art. These include, but are not limited to, the ODBC interface (open database connectivity) developed by Microsoft, JDBC (Java database connectivity) developed by Sun Microsystems for use with the Java programming language, the Perl DBI interface available for use with the freely-available Perl programming language, and the Perl DBM interface for working with DBM database files.

Once the data to be rendered has been identified, a rendering format for the data is needed before it can be inserted into the final web document. The command string identifies an "element type" for the data, which represents how the data will be rendered. Element types database 418 maps a number of "element types" to "base strings." The base strings contain HTML code for rendering the particular item(s) of data retrieved from descriptive text file 414 or database 416. Placeholders within each base string represent location(s) within the base string where data retrieved from descriptive text file 414 or database 416 should be inserted.

If, for example, a single item of data is retrieved from descriptive text file 414 or database 416, such as a string of text, the single item of data is simply inserted into the base string and the modified base string simply inserted into the final web document. If, on the other hand, a table or list of data is retrieved from database 416, for example, each entry in the list or table will be rendered a copy of the base string.

Finally, once each of the command strings is replaced with one or more rendered base strings, the resulting web document is stored in web site documents 404, for subsequent use by HTTP server 406. Client 410 requests the rendered document from HTTP server 406. HTTP server 406 then returns the rendered document through Internet 408 to client 410.

Rendering program 402 can be made to run periodically (e.g., every two hours), or at any other appropriate time (e.g., whenever an update is made to the database). The frequency with which rendering program 402 updates web site documents 404 will depend, in practice, on the level of accuracy required by the particular application. For example, stock market information may need to be updated more frequently (e.g., whenever a change occurs) than bank account information (e.g., daily).

FIG. 5 depicts a source document (500) in accordance with a preferred embodiment of the present invention. Source document 500 contains standard HTML tags and text as well as command strings (502 and 504). Each of command strings 502 and 504 is an instruction to the rendering program to replace the command string with particular data.

Each command string (such as command string 504) begins with a command prefix (506). Command prefix 506 identifies command string 504 as a command string. Additional fields (508, 510, 512, 514), separated by colons, denote what data is to be inserted in place of command string 504. A command string may contain four fields, in which case it contains an element type such as element type 508 in command string 504, or it may not, as in command string 506.

Element type 508 denotes which base string from element type database 418 is to be used in rendering the data. If no element type is given, it is assumed that the data is to be reproduced verbatim from the database with no additional formatting. Database domain 510 denotes which database or descriptive text file (or subdivision of a database or descriptive text file) the data to be rendered comes from. Number of columns 512 denotes how many columns the data is to be printed in. Format modifier 514 provides additional information about how the data should be formatted. For instance, a list of items may be formatted as an HTML table, as a numbered list, as a bulleted list, or simply output on separate lines. Format modifier 514, which is set to "TABLE" means that the data should be formatted in an HTML table.

Command strings may be used to render data that is stored in a table of database entries, as with command string 504, or they may be used to render single elements of data, as with command string 502. Command string 504 contains the string "_domain" in database domain 510, which denotes that a table is being rendered. Command string 502 does not include the "_domain" string. In rendering the table of data represented by command string 504, the rendering program will render each item in the table using the base string.

FIG. 6 depicts an element type database (600) in accordance with a preferred embodiment of the present invention. Element type database 600 is here represented by a flat file of name-value pairs, although one of ordinary skill will appreciate that any suitable database type may be used in practice. Each name-value pair is on a separate line, such as line 602. A name (604) representing the element type precedes a colon (606). Following colon 606 is a base string 608, containing HTML code. Base string 608 includes placeholders (610, 612, 614, and 616), which are to be replaced with data from a database or descriptive text file. In particular, placeholders 610, 612, 614, and 616 are to be replaced with a name, value, and descriptions, respectively, from each database entry.

FIG. 7 is a diagram of a descriptive text file (700) in accordance with a preferred embodiment of the present invention. Descriptive text file 700 contains lines 701, with each of lines 701 representing a mapping from a name (e.g., 702) to a text value (e.g., 706), with the name and value separated by a colon (e.g., 704). A new descriptive text file for use with the same source document but written in a different language may be made by copying descriptive text file 700 and replacing each of the text values (e.g., 706) with a translation of the same.

FIG. 8 is a diagram depicting a completed, rendered web document (800) as produced by a preferred embodiment of the present invention. Line 802 contains text retrieved from a database and substituted for command string 602 in FIG. 6. Lines 804 represent rendered text substituted for command string 604 in FIG. 6. Recall that command string 604 called for the inclusion of a table of items from a database, rendered in an HTML table. HTML table tags 806 set up the table structure for the data, while rendered strings 808 contain the actual data. Each of rendered strings 808 was derived by taking the designated base string (the one corresponding to the element type "CHECKBOX") and substituting data values from one of the entries in the database table.

FIG. 9 is a flowchart representation of a process of rendering a web document in accordance with a preferred embodiment of the present invention. First, a line of the source document is read (step 900). If the line contains a command string (step 902:Yes), then the command string is parsed to determine what fields it contains (step 904). The data to be rendered is retrieved from the appropriate database or descriptive text file (step 906). If the command string contains an element type (step 908:Yes), then the base string corresponding to the element type is retrieved (step 910). The placeholders within the base string are replaced with the data to be rendered (step 912), the modified base string is substituted for the command string in the original line, and the modified line is written to the output web document (step 914). If the command string does not contain an element type (step 908:No), then the retrieved data is substituted verbatim for the command string in the original line, and the modified line is written to the output web document (step 916).

If there is no command string in the line (step 902:No), then the line is simply copied to the output web document (step 920). If the source document contains more lines, then the process cycles to step 900 to read the next line (step 918:Yes). Otherwise, the process terminates (step 918:No).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of maintaining a web page, comprising the computer-implemented steps:

at regular intervals or when dynamic content changes, performing the following steps:
retrieving a source document for said web page;
locating a plurality of command strings within said source document, wherein each command string of said plurality of command strings includes a respective element type and at least one respective element parameter;
retrieving a respective base string corresponding to said respective element type;

modifying said respective base string according to said at least one respective element parameter to obtain a respective rendered string;

replacing said respective command string in said source document with said respective rendered string;

after said retrieving, locating, modifying, and replacing steps, saving said source document as a current web page;

whereby a server responding to a request for dynamic content does not need to render the dynamic content.

2. The method of claim 1, wherein the base string is retrieved from a data structure.

3. The method of claim 1, wherein the at least one element parameter includes one of a name, a value, a description, a number of columns, or a format modifier.

4. The method of claim 1, wherein the at least one element parameter includes a database domain.

5. The method of claim 1, wherein the element type is one of checkbox, selection, radiobutton, textarea, button, heading, or title.

6. The method of claim 1, wherein the base string includes tags written in a structure markup language.

7. The method of claim 6, wherein the structured markup language is one of Hypertext Markup Language (HTML), Extensible Markup Language (XML), Wireless Markup Language (WML), or Standard Generalized Markup Language (SGML).

8. The method of claim 1, wherein the base string includes an embedded script.

9. The method of claim 8, wherein the embedded script is one of a client-side script or a server-side script.

10. The method of claim 1, wherein modifying the base string according to the parameters to obtain a rendered string includes replacing a substring within the base string with one of the element parameters.

11. The method of claim 1, wherein modifying the base string according to the parameters to obtain a rendered string includes:

using one of the element parameters to retrieve a replacement substring from a database; and replacing a substring within the base string with the replacement substring.

12. The method of claim 1, wherein the method is performed in a rendering program.

13. A computer program product in a tangible computer-readable medium for maintaining a web page, comprising instructions for:

at regular intervals or when dynamic content changes, performing the following steps:

retrieving a source document for said web page;

locating a plurality of command strings within said source document, wherein each command string of said plurality of command strings includes a respective element type and at least one respective element parameter;

retrieving a respective base string corresponding to said respective element type;

modifying said respective base string according to said at least one respective element parameter to obtain a respective rendered string;

replacing said respective command string in said source document with said respective rendered string;

after said retrieving, locating, modifying, and replacing steps, saving said source document as a current web page;

whereby a server responding to a request for dynamic content does not need to render the dynamic content.

14. The computer program product of claim 13, wherein the base string is retrieved from a data structure.

15. The computer program product of claim 13, wherein the at least one element parameter includes one of a name, a value, a description, a number of columns, or a format modifier.

16. The computer program product of claim 13, wherein the at least one element parameter includes a database domain.

17. The computer program product of claim 13, wherein the element type is one of checkbox, selection, radiobutton, textarea, button, heading, or title.

18. The computer program product of claim 13, wherein the base string includes tags written in a structure markup language.

19. The computer program product of claim 18, wherein the structured markup language is one of Hypertext Markup Language (HTML), Extensible Markup Language (XML), Wireless Markup Language (WML), or Standard Generalized Markup Language (SGML).

20. The computer program product of claim 13, wherein the base string includes an embedded script.

21. The computer program product of claim 20, wherein the embedded script is one of a client-side script or a server-side script.

22. The computer program product of claim 13, wherein modifying the base string according to the parameters to obtain a rendered string includes replacing a substring within the base string with one of the element parameters.

23. The computer program product of claim 13, wherein modifying the base string according to the parameters to obtain a rendered string includes:

using one of the element parameters to retrieve a replacement substring from a database; and replacing a substring within the base string with the replacement substring.

24. The computer program product of claim 13, wherein said computer program is a rendering program.

25. A data processing system for maintaining a web page, comprising:

a bus system;

a processing unit connected to the bus system, wherein the processing unit includes at least one processor;

at regular intervals or when dynamic content changes, performing the following steps:

retrieving a source document for said web page;

locating a plurality of command strings within said source document, wherein each command string of said plurality of command strings includes a respective element type and at least one respective element parameter;

retrieving a respective base string corresponding to said respective element type;

modifying said respective base string according to said at least one respective element parameter to obtain a respective rendered string;

replacing said respective command string in said source document with said respective rendered string;

after said retrieving, locating, modifying, and replacing steps, saving said source document as a current web page;

whereby a server responding to a request for dynamic content does not need to render the dynamic content.

26. The data processing system of claim 25, wherein the base string is retrieved from a data structure.

27. The data processing system of claim 25, wherein the at least one element parameter includes one of a name, a value, a description, a number of columns, or a format modifier.

28. The data processing system of claim 25, wherein the at least one element parameter includes a database domain.

29. The data processing system of claim 25, wherein the element type is one of checkbox, selection, radiobutton, textarea, button, heading, or title.

30. The data processing system of claim 25, wherein the base string includes tags written in a structure markup language.

31. The data processing system of claim 30, wherein the structured markup language is one of Hypertext Markup Language (HTML), Extensible Markup Language (XML), Wireless Markup Language (WML), or Standard Generalized Markup Language (SGML).

32. The data processing system of claim 25, wherein the base string includes an embedded script.

33. The data processing system of claim 32, wherein the embedded script is one of a client-side script or a server-side script.

34. The data processing system of claim 25, wherein modifying the base string according to the parameters to obtain a rendered string includes replacing a substring within the base string with one of the element parameters.

35. The data processing system of claim 25, wherein modifying the base string according to the parameters to obtain a rendered string includes:

using one of the element parameters to retrieve a replacement sub string from a database; and replacing a substring within the base string with the replacement substring.

* * * * *